United States Patent Office 3,099,585
Patented July 30, 1963

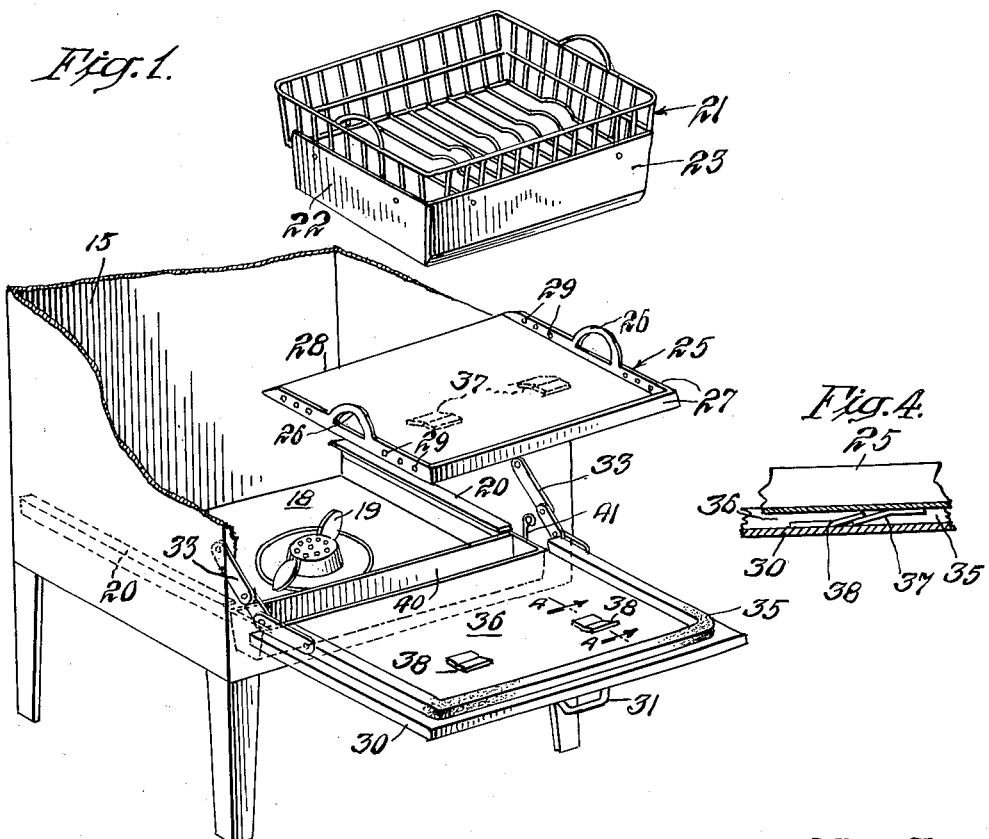
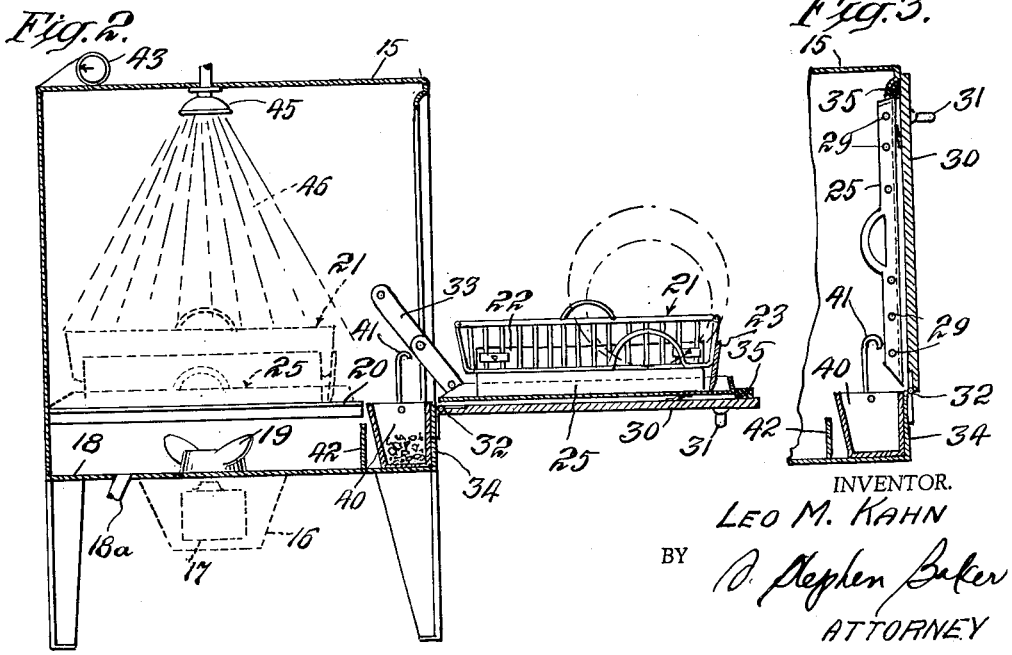

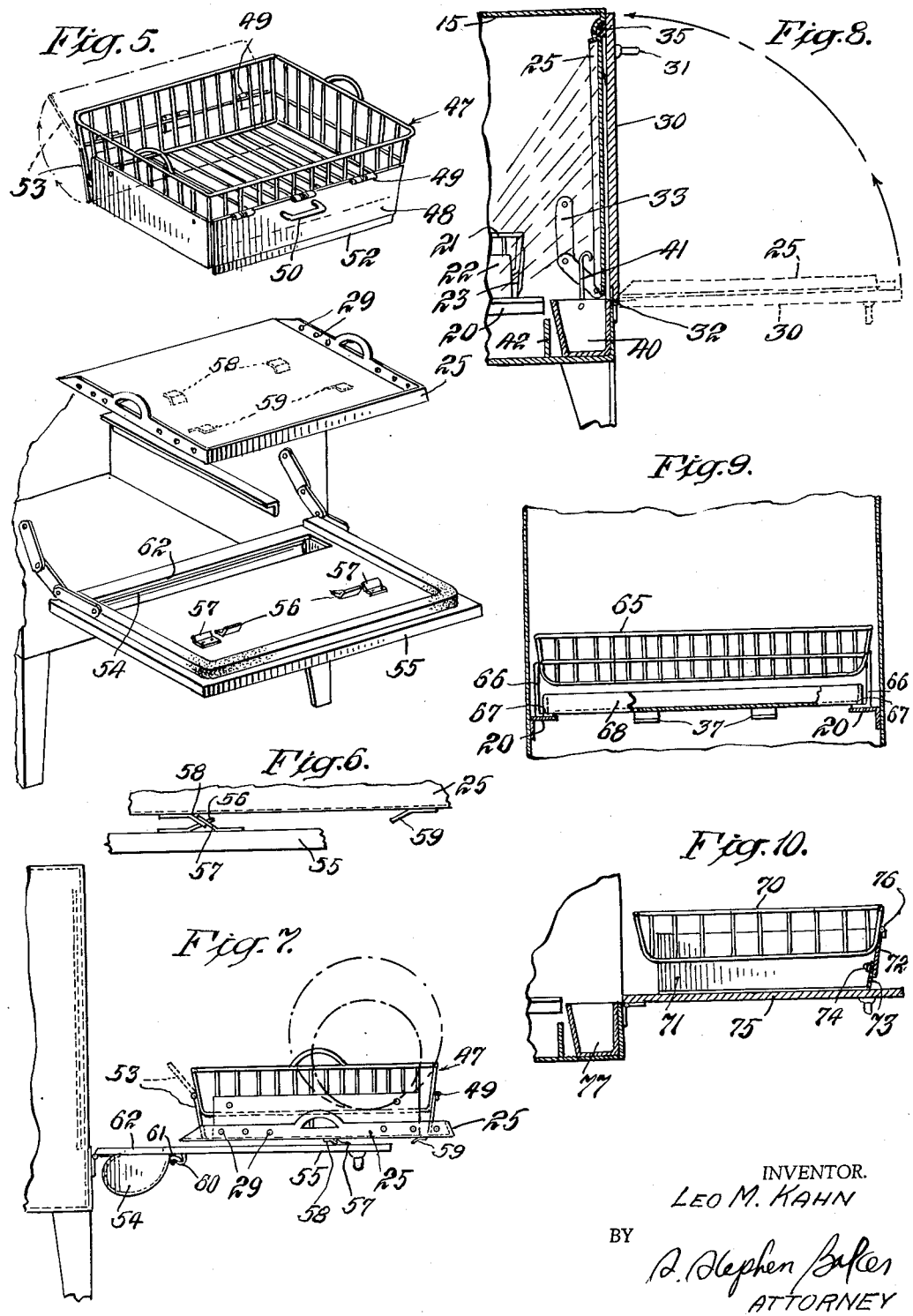

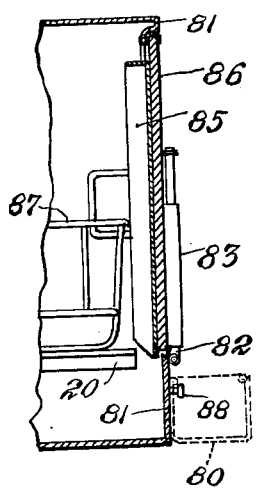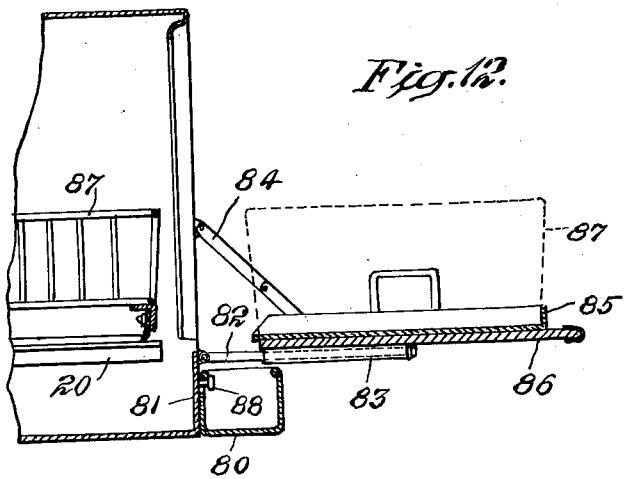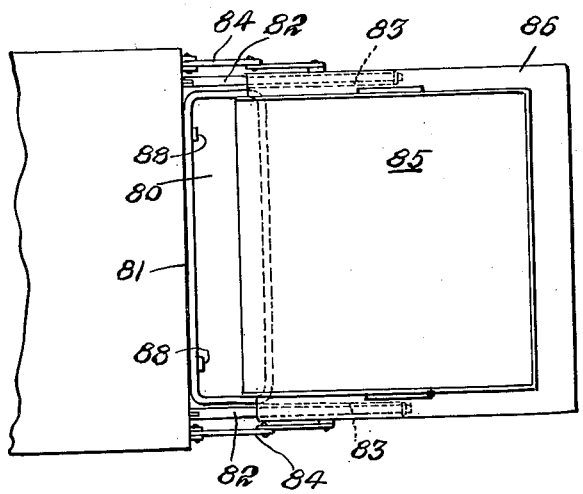

3,099,585
DISHWASHING MACHINES AND METHOD
Leo M. Kahn, 305 95th St., Brooklyn 9, N.Y.
Filed Oct. 14, 1958, Ser. No. 767,226
13 Claims. (Cl. 134—6)

This invention relates to improvements in dishwashing machines and method.

So-called automatic dishwashers have not had complete acceptance because they are not, in fact, fully automatic. Thus, a user is generally required to remove dishes from the table, scrape them off into a receptacle, most times pre-rinse them in the sink, and deposit them singly in the washing machine. Accordingly, a prospective user often considers that the dish washer is not particularly useful.

With the above in mind, I have devised a dishwashing system which eliminates much of the above preparatory activities. Thus, I provide a combined wire basket and underlying tray or drip pan which permits the dishes to be loaded at the table and generally does not require pre-scraping them. On the other hand, when the dishes are loaded into a basket, any foodstuffs will fall upon the underlying pan. Both the pan and the basket are inserted into the machine, means being provided on the basket to scrape the pan and drippings as the basket is inserted into position in the machine. Thus, as explained in my prior application Serial No. 701,875, filed December 10, 1957, now Patent No. 2,937,063, of which this application is a continuation in part, both the basket and the pan are exposed to the action of a washing medium in the washing compartment of the machine.

A particular feature of this application is the provision of a removable refuse container as part of the machine. Thus, the wire basket is arranged to scrape leavings from the pan directly into the refuse container so as to eliminate the preparatory step above mentioned. It will be further recognized that the provision of such a refuse container makes practical the employment of a pre-wash within the machine itself. In other words, the user will have no occasion to pre-wash the dishes in the sink since that operation may be effected within the machine itself.

The invention will be further understood from the following description and drawings in which:

FIGURE 1 is a perspective, fragmentary, exploded view of the various elements of this invention;

FIGURE 2 is a cross-sectional view of a machine illustrating the machine loading functions and further illustrating the method by which the dishes are given a pre-wash;

FIGURE 3 is a fragmentary cross-sectional view of the door section of the machine in closed position during the final wash;

FIGURE 4 is an enlarged fragmentary view illustrating the connection of the pan to the door, the door portion of FIGURE 4 being taken along the line 4—4 of FIGURE 1;

FIGURE 5 is a perspective, fragmentary, exploded view similar to FIGURE 1 but illustrating a modified embodiment;

FIGURE 6 is a fragmentary view illustrating the co-action of the pan and the door of the machine shown in FIGURE 5;

FIGURE 7 is a fragmentary view illustrating the operation of the above modified embodiment;

FIGURE 8 is a substantially diagrammatic view of either of the above embodiments in the final washing period;

FIGURE 9 is a fragmentary view of a second modified embodiment whereby the pan, instead of supporting the basket, is itself supported by the basket although still in an underlying position;

FIGURE 10 is a fragmentary view of a third modified embodiment wherein the pan is dispensed with although the basket still serves as a scraper for cleaning drippings and leavings from the door of the machine into an inside refuse container;

FIGURE 11 is a fragmentary view of a fourth modified embodiment wherein the refuse container is attached to the outer front wall of the machine and the door is modified;

FIGURE 12 is a fragmentary view of the machine shown in FIGURE 11, with the door open; and FIGURE 13 is a top view of the machine as shown in FIGURE 12.

Referring to FIGURES 1 to 4, the dishwashing machine is largely conventional. In the form shown it comprises a cabinet-like housing 15 wherein a compartment is provided at 16 (FIGURE 2) for an electric motor 17. Above the floor 18 of the machine is disposed the usual impeller 19 which is driven by the motor and which serves to send up a forceful spray of water to the washing compartment, all as conventional. Of course, conventional water input and drain sytsems such as valve controlled drain pipe 18a, are employed.

Opposing shelves 20 serve to support a removable lattice work basket 21 as will hereinafter be shown. Basket 21 is ordinarily fabricated of wire or the like formed as to hold a variety of dishes, cups, silverware, or the like. For purposes which will be more fully described hereinafter, it is provided with rigid sides 22 of metal or plastic which simply serve as runners as well as supports in conjunction with shelves 20. Basket 21 is also formed with a front wall 23 of semi-rigid rubber which serves as a scraper, the bottom edge thereof being lowermost and tapering down to a scraping edge.

Pan 25 is used in conjunction with basket 21. Pan 25 actually serves as a drip pan and, in the form shown, supports basket 21. It is provided with carrying handles 26 and walls 27 along three sides thereof. The inside edge 28 of pan 25 is not provided with a wall so as to facilitate scrapings of leavings on the pan into a container as will be described hereinafter. In addition, the side walls of tray 25 may be provided with openings 29 such openings being useful in the pre-wash as will hereinafter be made clear.

In the form described, the machine includes a door 30 having a top handle 31, a bottom horizontal hinge 32 which usually incorporates a closing spring, not shown, and links 33 connecting the door to a wall of the machine. Door 30 is of the type which constitutes the front wall 34 of the housing 15. It is provided with a gasket 35 and may be itself dish-shaped so as to provide a well 36 on its interior surface. The well 36 serves to receive the drip pan or tray 25 as will hereinafter be described. The other walls of the machine remain vertical.

The underside of pan 25 is formed with a pair of tongues 37. Likewise, the interior surface of door 30, within well 36, is formed with a pair of opposing tongues 38. These tongues are arranged to respectively interlock when the pan is slid into position on the door interior. Thus, referring to FIGURE 4, as a pan 25 is slid into and over well 36, the respective tongues 37 and 38 engage and so as to secure the pan 25 to the door. Thereafter, as will be explained, when the door is swung to the closing position, the tray will be suspended thereon.

Within the washing compartment is disposed a refuse container 40. Referring to FIGURE 2, it will be noted that the refuse container is disposed immediately succeeding the door hinge and in a position in front of the shelves 20. Container 40 is removable from the washing compartment. It is elongated, being of substantially the width of the washing compartment and is provided with end handles 41. In order to have a distinct compartment therefor, partition 42 is provided, thereby keeping excessive water from the container.

A typical method of employing this invention is as follows:

During the course of a dinner, or after the dinner has been completed, the user may load the soiled dishes into the basket 21 while the basket is resting upon the pan 25. These units may be resting on a small utility table, which, if desired, could be provided with rollers so that it may be thereafter wheeled to the dishwasher. When loading the basket 21 it is preferable to remove large objects like bones but other objects such as left-over small vegetables or gravy or the like need not be scraped off at the table.

Thereafter the loaded basket together with the pan is brought to the dishwasher, using the handles 26 of the pan 25 for lifting both the pan and the basket together. At this time the user may decide to employ a pre-wash before commencing the usual final wash which is illustrated in FIGURE 8. Assuming however that a pre-wash is desired, the user may nevertheless proceed to preliminarily scrape the leavings on pan 25 into container 40 by causing the tongues 37 and 38 to interlock so as to lock the pan 25 to the door 30 and thereafter pushing the basket onto the shelves 20 so as to scrape the leavings off pan 25 and into container 40. This operation will be further explained hereinafter it being considered preferable, for purposes of clarity, to first describe the optional pre-wash.

After having preliminarily scraped the pan 25, the user will unlock tongues 37 and 38 and will deposit both the basket 21 and pan 25 on the shelves 20 as indicated by the broken lines of FIGURE 2. The user may set the cycle control or timer 43 for a pre-wash and will close the door 30. Such timers are of course conventional.

For the purposes of the pre-wash the machine is provided with an overhead sprinkler 45 which sprays the dishes with a forceful stream 46, thus assisting the natural forces of gravity in dislodging residual food from the dishes. Drain 18a will be open at this time so that the water drains as fast as it comes in and substantially none builds up in the machine.

The food thus dislodged from the dishes accumulates in the pan 25. The purpose of openings 29 is to permit the water 46, after having sprayed the dishes and fallen to pan 25, to flow through the openings 29 while leaving the food on the floor of the pan. It will be observed from FIGURE 2 that the bottom of the basket 21 is spaced above the floor of pan 25. Side walls 22 and front wall 23 maintain such spacing. I consider that basket 21 should be thus supported about 1½" above pan 25. Further, the sides 22 and wall 23 serve as enclosures during the pre-wash to discourage any floating away of foods. Of course, a fourth wall may be provided as in FIGURE 5 or the basket may be pushed all the way in so that the back of the machine serves as an enclosing wall.

After the pre-wash has been completed, the user will open the door, pull back the basket 21 and pan 25 to their rest position on the door and will then be certain that tongues 37 and 38 are locked so as to make fast the pan to the door.

Thereafter, the basket 21 is pushed forwardly, the side walls 22, which are of metal or rigid plastic, serving as runners whereby the basket may be slid across the pan 25 and on to the shelves 20. As above stated, front wall 23 serves as a pusher or scraper thereby clearing of accumulated drippings, solid or liquid, from the floor of the pan 25 as the basket 21 is pushed inwardly.

It will be understood therefor that the very act of pushing the basket into washing position in the washing compartment scrapes the pan 25 into which has been deposited or into which has dripped or fallen refuse from the up-ended dishes such as illustrated in FIGURE 2. Further, such drippings and leavings are automatically pushed from the pan 25 into the refuse container 40 which is disposed forwardly of the supporting shelves 20 as illustrated in FIGURES 1 and 2. Accordingly, the user need not scrape the dishes at the table but the leavings will fall off the dishes when they are up-ended as illustrated in FIGURE 2, will further accumulate in the pan during a pre-wash, and will thereafter be automatically pushed into the refuse container 40.

After the basket 21 is set in place on the shelves 20, the door 30 will be closed. The pan 25 will be suspended on the door by means of the interlocking tongues 37 and 38 as illustrated in FIGURE 3. The general arrangement will be as illustrated in FIGURE 8. The action of the machine will then commence, such action being largely conventional. In other words, the impeller 19 will send a forceful spray of wash water to the substantially open underside of the basket 21 so as to wash the load of dishes. At the same time, the suspended pan 25, which is also separately exposed to the wash water, will be washed. The machine goes through the complete washing cycle whereupon the door 30 may be opened and the basket 21 rolled back on to the clean pan 25. At this time, the basket 21 and pan 25 may be removed jointly and deposited outside of the machine. Any residual cleaning water from the dishes will drip on to the pan 25 which is again restored to its drip receiving function. If desired, another basket 21 together with another pan 25 may be inserted into the machine as described above so as to make possible the cleaning of a second load without waiting for the usual hot air drying period.

At the termination of the washing cycle, the user may simply lift up the container 40 by means of the handles 41 and may empty the container into a garbage can or the like.

In FIGURE 5 is illustrated a basket 47 with the same side walls as in the previous embodiment. Front wall 48 may be of metal with a semi-rigid rubber bottom edge 52 serving as a scraper. It is hinged to the basket by means of spring hinges 49 which permit outward swinging only. The springs of hinges 49 are strong enough to permit scraping of the pan 25 by wall 48 but nevertheless enable manual lifting of the wall as by handle 50. The purpose of this arrangement is to permit dishes to be scraped at the table. Thus, a dish holding bones, vegetables etc. may be deposited under the basket 47 by manually lifting wall 48. Wall 48 will then be dropped and will fall on the inserted and manually held dish. The user will then withdraw the dish so that the leavings will be scraped by wall 48 into the pan 25.

Furthermore rear wall 53 of basket 47 is hinged to the basket so that it can be swung upwardly into an open position, or downwardly into a closed position as illustrated in FIGURE 5. The purpose of this arrangement is to permit the user to raise wall 53 at the table so that large objects, such as bones, can be deposited on the tray. The hinged walls permit either of the above methods to be used in directly loading the pan 25 with food leavings. Such leavings are thereafter deposited in the container 54 which serves the same function as first mentioned container 40.

Container 54 is actually built into the door 55 as illustrated in FIGURES 5 and 7. Accordingly, it is necessary that the pan 25 occupy a forward position so as not to obstruct container 54 when the leavings are being scraped from the pan. Accordingly, pan 25 has two rest positions which are controlled by the respective tongues 56 and 57. As in the previous embodiment, interlocking tongues 58 and 59 are formed on the bottom of pan 25 as illustrated in FIGURE 6. Thus, pan 25 will be maintained in a forward position during the sliding of basket 47 from its position on the pan into its washing position in the machine while the leavings are scraped into container 54. Thereafter tray 25 is slid forwardly so as to now obstruct and cover container 54. Tray 25 will be locked in its second position by means of its tongues 59 in conjunction with tongues 56.

Of course, this second embodiment also contemplates an optional pre-wash as above described. In this connection, wall 53 in its normally downward position will maintain food solids against floating out of the pan 25.

After the final wash has been completed, container 54 may be removed and emptied at any time. In fact, it may also be emptied before washing commences if preferred. Container 54 is slidably held in clips 60 which engage complementary flanges 61 on the container. When the container is slid out, exposing elongated discharge slot 62 in door 55, the container may be emptied or a supplementary, empty container may be slid into its place.

In FIGURE 9 is illustrated a basket 65 wherein the side walls 66 are formed with inward flanges 67 which support pan 68. These are shown as jointly deposited on the shelves 20 as during a pre-wash. In other words, the basket 65 supports the pan instead of being supported by it. The lattice work of the basket 55 may serve as handles.

Pan 68 may serve to receive any food or scraps which the user chooses to directly deposit thereon. In fact, it may be thus used apart from the basket the leavings therefrom being dumped into a garbage pan or disposal unit. It is then restored under the basket and connected to the door in the manner above described whereupon it is cleaned in the normal washing operation. In this embodiment, the basket does not do any scraping.

In FIGURE 10 is illustrated a modified embodiment wherein the basket 70 is formed with side walls 71 and a front wall 72 which serves as a scraper. Front wall 72 is fabricated of metal and it has a semi-rigid rubber scraping edge 73 removably connected thereto as by set screws 74. The purpose thereof is to enable the scraping edge 73 to be replaced when worn out. In FIGURE 10, no pan is employed, the basket instead serving to scrape the inner walls of door 75. Assume for example, that basket 70 is resting on the door 75. Soiled dishes may then be deposited in the basket, some of the food and drippings falling to the inner wall of door 75. In addition, front wall 72 is provided with spring hinges 76 such as previously described, these springs being strong enough to permit scraping of the inner wall of door 75 but nevertheless permitting wall 72 to be raised and bones or the like thrown on to the door 75.

Thereafter, basket 70 is pushed inwardly as above described so that edge 73 scrapes the inner wall of the door and deposits the leavings into container 77.

In FIGURES 11 to 13 are disclosed a novel arrangement wherein the refuse container 80 is disposed completely out of the machine although connected to it. The front wall 81 of the machine is formed with telescopic arms 82 on each side thereof. The swinging arms 82 are hinged to the sides of the front while the telescoping members 83 are connected by hinged links 84 to such sides and above the connection of the arms 82.

Pan 85 connects to the front door 86 in the same manner as described above and serves as a support for the basket 87. When the door is opened it can be slid outwardly, being integrally connected with the telescoping members 83. This exposes the open mouth of container 80 between the arms 82. Accordingly, basket 87 may be slid over pan 85 thereby scraping the leavings into container 80. Thereafter, the door is slid inwardly to cover the open mouth of container 80 and is then closed for the usual washing cycle, the basket 87 resting on the shelves 20 while the pan 85 is secured to the door 86. Container 80 is connected to the front wall of the machine by releasable screws 88 so that it can be emptied or replaced as desired.

In all of the tray embodiments, the tray is useful in and of itself as a food leaving receptacle which is connectable to a wall of the machine, e.g., the door, so as to be thereafter washed simultaneously although separated from the basket so as not to interfere with the washing action. The tray may be connected to or installed on such wall whether or not it is loaded with movable garbage. If it is so loaded, such garbage may be scraped off into one of the containers illustrated prior to commencing the normal washing cycle.

What is claimed is:

1. A dishwashing machine comprising a washing compartment, means in said compartment to removably support a dish holding basket therein, a tray outside of said compartment adapted to slidably support said basket and receive drippings therefrom when said basket is supported thereby, a scraper connected to said basket and adapted to scrape food leavings off said tray as said basket is slid over said tray, and a container disposed on said machine and adapted to receive said food leavings when scraped off said tray by said basket.

2. A dishwashing machine according to claim 1 and wherein said container is removable from said machine so as to permit said container to be emptied.

3. A dishwashing machine according to claim 2 and including a door in said machine, said door being movable to a substantially horizontal position, said tray and basket being supportable by said door, said container being disposed inwardly of said door whereby when said basket is slid over said tray, it brushes said leavings into said container, said basket being supportable by said door when in said substantially horizontal position and said container being disposed inwardly of said door when the door is in said position.

4. A dishwashing machine according to claim 3 and wherein said scraper comprises a front wall formed on said basket, said front wall depending downwardly from said basket and having a semi-rigid member formed on the lower end thereof so as to scrape food leavings off said tray.

5. A dishwashing machine according to claim 4 and wherein said front wall extends downwardly approximately 1½" from the bottom of said basket, and side walls formed on said basket, said side walls and front wall supporting said basket approximately 1½" above said tray.

6. A dishwashing machine according to claim 5 and wherein said tray is formed with side walls, said side walls being formed with openings therethrough whereby said tray may be disposed within the machine and water entering said tray will be discharged through said openings.

7. For use in a dishwashing machine, the subcombination of a dish holding basket, a front wall depending downwardly from said basket and having a lowermost, horizontal scraping edge, a tray slidably supporting said basket whereby when said basket is slid over said tray said scraping edge will brush food therefrom, and side walls formed on said basket, said side walls and said rear wall supporting said basket approximately 1½" above said tray, said tray being formed with side walls, said tray side walls being formed with openings whereby said tray and basket may be deposited within said washing compartment and water flowing through said basket and tray will be discharged from said openings while leaving solid material on said tray.

8. For use in a dishwashing machine, the subcombination of a dish holding basket, a front wall depending downwardly from said basket, a scraper connected to the lower edge of said front wall, a tray slidably supporting said basket, said scraper brushing food from said tray when said basket is slid over said tray, means for supporting said basket above said tray so as to leave a space therebetween, and a swingable rear wall on said basket whereby said rear wall may be raised upwardly for depositing solid material upon said tray which may thereafter be scraped therefrom.

9. For use in a dishwashing machine, the subcombination of a dish holding basket, a front wall depending downwardly from said basket and having a lower scraping edge, and a tray slidably supporting said basket whereby when said basket is slid over said tray said scraping edge will brush food therefrom, said front wall being swingably connected to said basket so that it may be swung to either an operative or inoperative position.

10. A dishwashing machine comprising a washing compartment, means in said compartment to removably support a dish holding basket therein, a door for said machine, said door being movable to a substantially horizontal position, a tray supportable on said door in either of two positions, said tray being adapted to slidably support said basket when said door is in said substantially horizontal position and receive drippings therefrom when said basket is supported thereby, a scraper connected to said basket and adapted to scrape food leavings off said tray as said basket is slid over said tray, and a container formed in said door and adapted to receive said food leavings when scraped for said tray by said basket, said tray being movable on said door to a forward position so as to uncover said container preparatory to having said food leavings scraped therefrom, and being further movable to a rearward position so as to close said container.

11. In a method of cleaning dishes in a washing machine having basket supporting means therein and having a front door, said door being movable to a substantially horizontal position which comprises stacking the dishes in a lattice work basket having a removable tray thereunder, depositing said basket and tray on the open door of the washing machine while locking the tray thereto, simultaneously sliding said basket from said tray through the door opening on to said basket supporting means while scraping any food leavings off said tray into a receptacle, and thereafter closing said door for the dishwashing operation.

12. A dishwashing machine comprising a washing compartment, means in said compartment to removably support a dish holding basket therein, a tray adapted to slidably support said basket and receive drippings therefrom when said basket is supported thereby, means on said basket for scraping food leavings from said tray as said basket is slid thereover, a downwardly swingable front door on said machine, means to slide said front door outwardly of said machine so as to leave a horizontal space between the lower edge of said door and said machine, and a refuse container connected to the bottom end portion of said machine and having an open mouth which is exposed when said door is slid outwardly, said refuse container being adapted to receive the food leavings which are scraped from said tray by said basket.

13. In a method of cleaning dishes in a washing machine having basket supporting means and having a door, which comprises stacking the dishes in a lattice work basket having a removable tray thereunder and on which said basket is slidable, and while said tray is outside of the machine sliding said basket over said tray and through the doorway on to said basket supporting means while simultaneously scraping any food leavings off said tray by said sliding action, and closing said door for the dishwashing operation.

References Cited in the file of this patent

UNITED STATES PATENTS

| | | |
|---|---|---|
| 449,746 | Parmley | Apr. 7, 1891 |
| 553,943 | Springmire | Feb. 4, 1896 |
| 738,301 | Dowd | Sept. 8, 1903 |
| 1,048,862 | Nesbitt | Dec. 31, 1912 |
| 1,193,129 | Dorough | Aug. 1, 1916 |
| 1,423,342 | Loew | July 18, 1922 |
| 1,597,129 | Watters | Aug. 24, 1926 |
| 1,629,155 | Dostal | May 17, 1927 |
| 1,691,839 | Caskin | Nov. 13, 1928 |
| 1,888,127 | Hearne | Nov. 15, 1932 |
| 1,921,052 | Underwood | Aug. 8, 1933 |
| 2,529,267 | Sloane | Nov. 7, 1950 |